US007976264B1

(12) United States Patent
Pope (10) Patent No.: US 7,976,264 B1
(45) Date of Patent: Jul. 12, 2011

(54) TRUCK BED APPARATUS

(76) Inventor: Timothy W. Pope, Festus, MO (US)

(*) Notice: Subject to any disclaimer, the term of this patent is extended or adjusted under 35 U.S.C. 154(b) by 504 days.

(21) Appl. No.: 12/191,185

(22) Filed: Aug. 13, 2008

(51) Int. Cl.
*B60P 1/02* (2006.01)
(52) U.S. Cl. .......................... 414/480; 414/537; 14/69.5
(58) Field of Classification Search .................. 414/480, 414/537; 14/69.5
See application file for complete search history.

(56) References Cited

U.S. PATENT DOCUMENTS

| | | | |
|---|---|---|---|
| 3,977,545 A | 8/1976 | Lloyd | |
| 4,242,032 A | 12/1980 | Whiteman et al. | |
| 4,601,632 A | 7/1986 | Agee | |
| 4,874,284 A * | 10/1989 | New, Jr. .................. | 414/537 |
| 4,900,217 A * | 2/1990 | Nelson ........................ | 414/537 |
| D360,729 S | 7/1995 | Collins | |
| 5,553,762 A | 9/1996 | Brown | |
| 5,795,125 A | 8/1998 | Walkden | |
| 6,253,976 B1 * | 7/2001 | Coleman et al. ............. | 224/404 |
| 6,431,815 B1 * | 8/2002 | Zarzecki et al. ............. | 414/537 |
| 6,612,635 B1 | 9/2003 | Scherrer | |
| 6,705,820 B2 | 3/2004 | Schilling | |
| 6,880,194 B2 * | 4/2005 | O'Donnell et al. ............ | 14/69.5 |
| D505,238 S | 5/2005 | Robertson | |
| 7,082,637 B1 * | 8/2006 | Griffin ........................ | 14/69.5 |
| 7,100,232 B2 * | 9/2006 | Zhang ......................... | 14/69.5 |
| 7,302,725 B2 * | 12/2007 | Thygesen .................... | 14/69.5 |
| 7,309,202 B1 | 12/2007 | Anderson | |
| 7,513,552 B2 * | 4/2009 | Carvalho ................... | 296/26.09 |
| 7,524,156 B2 * | 4/2009 | Garbes ........................ | 414/537 |
| 7,549,692 B2 * | 6/2009 | Washington .................. | 296/61 |
| 2008/0235886 A1 * | 10/2008 | Yang et al. ................... | 14/72.5 |

* cited by examiner

*Primary Examiner* — Joshua I Rudawitz
(74) *Attorney, Agent, or Firm* — Crossley Patent Law; Mark A. Crossley (57) ABSTRACT

The truck bed apparatus is provided as replacement or original equipment. An access below the platform selectively houses the individually rollingly removable ramps. Bi-directional hinges which fasten each ramp second section to each first section are lockable, giving the ramps infinite incline and decline capabilities. Bi-directional lockable hinges affix each third section to each second section for the same reason. Varied lengths of the hinged legs also provide selective angle and support for each ramp. The second and third sections can be pivotally fitted within the width of the first section and subsection, thereby providing a collapsed ramp height less than would otherwise be provided, which provides for the platform to be only marginally higher than a standard truck bed platform would otherwise be. The ramps can be collapsed and housed within the access, then removed and extended to a far greater length than the platform of the bed.

1 Claim, 7 Drawing Sheets

TRUCK BED APPARATUS

BACKGROUND OF THE INVENTION

A need has been established for a truck loading ramp which is removable from a truck bed. A further need has been established for a truck bed extension which allows support and transport of items longer than a typical truck bed. While each has been provided, a proper combination of a loading ramp and bed extension which is selectively stored below the bed has not been provided. The present truck bed apparatus provides advancement in the art with combination loading ramps and bed extensions slideably held within the bed. The apparatus has multiple locking bi-directional hinges which enable the ramps to be selectively and separately extended to a length greater than that of the bed platform.

FIELD OF THE INVENTION

The truck bed apparatus relates to truck beds and more especially to a truck bed having separately extendable, hinged ramps which may be selectively extended to a length less than, equal to, or greater than that of the bed platform.

SUMMARY OF THE INVENTION

The general purpose of the truck bed apparatus, described subsequently in greater detail, is to provide a truck bed apparatus which has many novel features that result in an improved truck bed apparatus which is not anticipated, rendered obvious, suggested, or even implied by prior art, either alone or in combination thereof.

To attain this, the truck bed apparatus is provided as a replacement or original equipment bed. An access below the well-supported platform selectively houses the individual ramps. The ramps can thereby be deployed separately or collectively. The keeper at the proximal end of each ramp removably fits within the slot of the platform, thereby selectively securing each ramp against slippage. Further, each ramp can be completely removed from the access and the platform. The bi-directional hinges which fasten each ramp second section to each first section are lockable, a feature shared with current ladder art and the like, giving the ramps infinite incline and decline capabilities. Bi-directional lockable hinges also affix each third section to each second section for the same reason.

The varied lengths of the hinged legs also provide selective angle and support for each ramp. With the second and third section widths being less than the width of the first section and subsection, the second and third sections can be pivotally fitted within the width of the first section and subsection, thereby providing a collapsed ramp height less than would otherwise be provided. This important feature allows a lessened access height which provides for the platform to be only marginally higher than a standard truck bed platform would otherwise be. Another very important advantage is gained by differing widths of the sections, which is that the ramps can be collapsed and housed within the access, then removed and extended to a far greater length than the platform of the bed. Rungs of the sections of the ramps are closely positioned and provide for both traction and light weight of the apparatus. Thus has been broadly outlined the more important features of the improved truck bed apparatus so that the detailed description thereof that follows may be better understood and in order that the present contribution to the art may be better appreciated.

An object of the truck bed apparatus is to provide separately extendable ramps which also selectively function as supports.

Another object of the truck bed apparatus is to selectively house the ramps below the platform.

A further object of the truck bed apparatus is to provide adjustable and bi-directional incline of the ramps.

An added object of the truck bed apparatus is to provide for minimal ramp storage height.

And, an object of the truck bed apparatus is to provide selective ramp length greater than the platform length.

A further object of the truck bed apparatus is to provide a typical bed platform above the ramp access.

These together with additional objects, features and advantages of the improved truck bed apparatus will be readily apparent to those of ordinary skill in the art upon reading the following detailed description of presently preferred, but nonetheless illustrative, embodiments of the improved truck bed apparatus when taken in conjunction with the accompanying drawings.

In this respect, before explaining the current embodiments of the improved truck bed apparatus in detail, it is to be understood that the truck bed apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved truck bed apparatus. It is therefore important that the claims be regarded as including such equivalent constructions insofar as they do not depart from the spirit and scope of the truck bed apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 7 thereof, the principles and concepts of the truck bed apparatus generally designated by the reference number 10 will be described.

Figure 1:
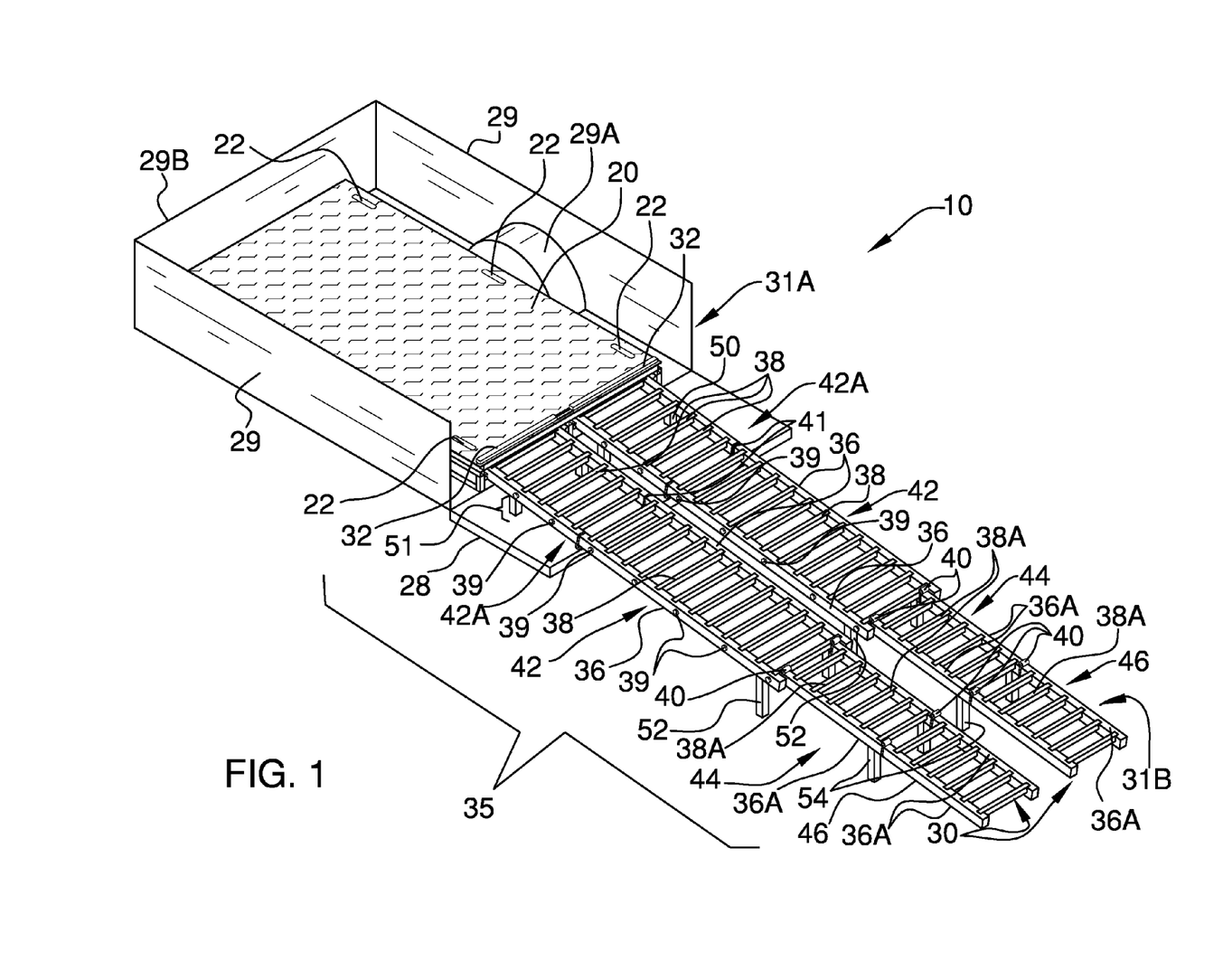
FIG. 1 is a perspective view, ramps fully extended.
Figure 2:
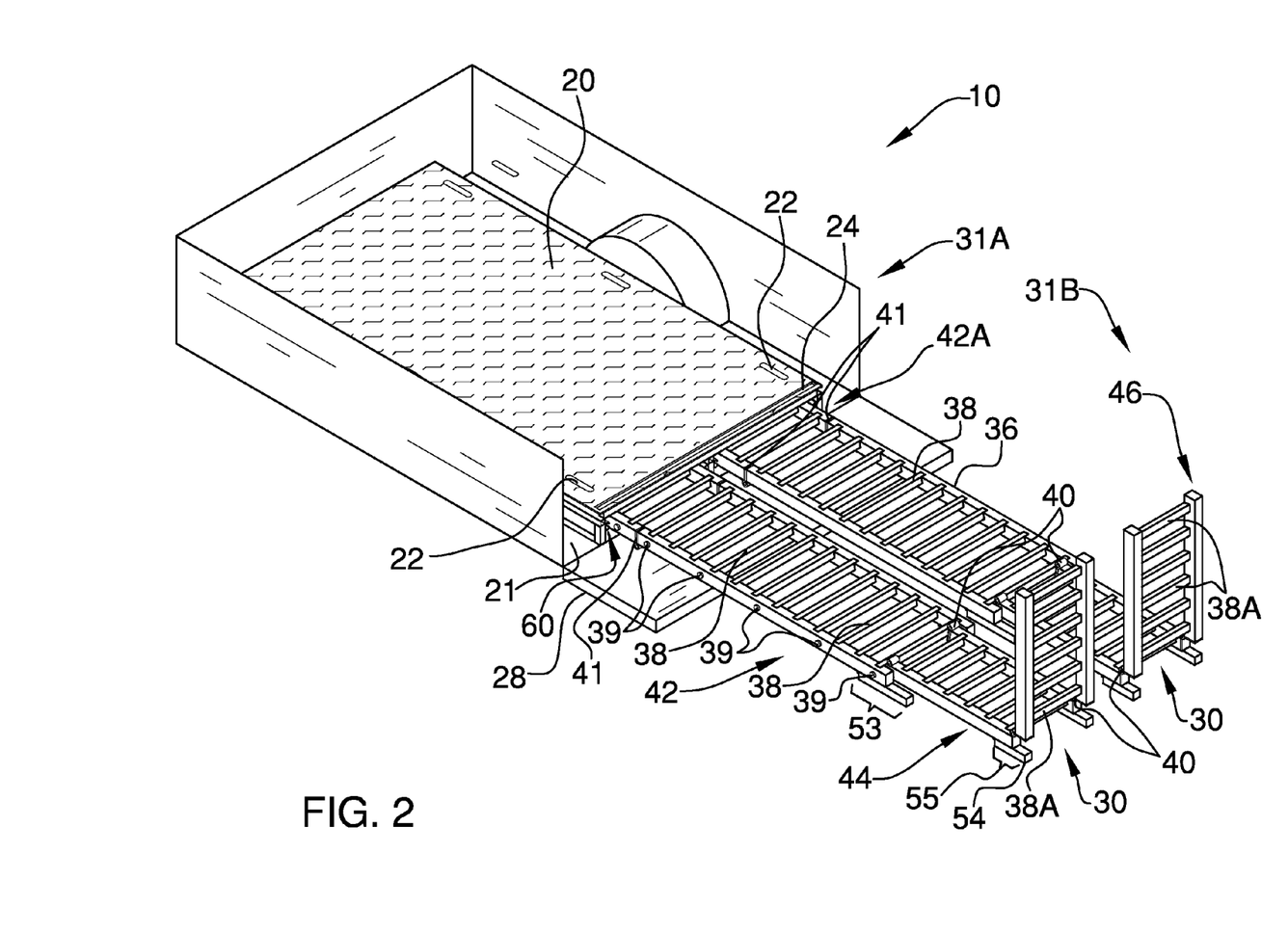
FIG. 2 is a perspective view, ramps partially extended and 3$^{rd}$ section vertical.

Referring to FIGS. 1 and 2, the truck bed apparatus 10 provides an alternative to a typical truck bed by providing extendable ramps 30 which can be partially extended from within the access 60 and remain parallel with and supported by the bed platform 20 and sub-platform 21. The ramps 30 are further supported by the rollers 39.

With the subsection 42a or the first section 42 either fully or partially within the access 60, the ramps 30, either together or individually provide an extended support surface distal from the platform 20. Longer items can thereby be transported and supported by the apparatus 10, as compared to a standard truck bed. The apparatus 10 is further partially comprised of the platform 20 with the plurality of spaced apart tiedowns 22 disposed within the platform 20. The pair of spaced apart vertical side panels 29 is provided, as is the vertical head panel 29b spaced apart from the pivoting tailgate 28. The wheel wells 29a provide for clearance of truck tires.

Figure 3:
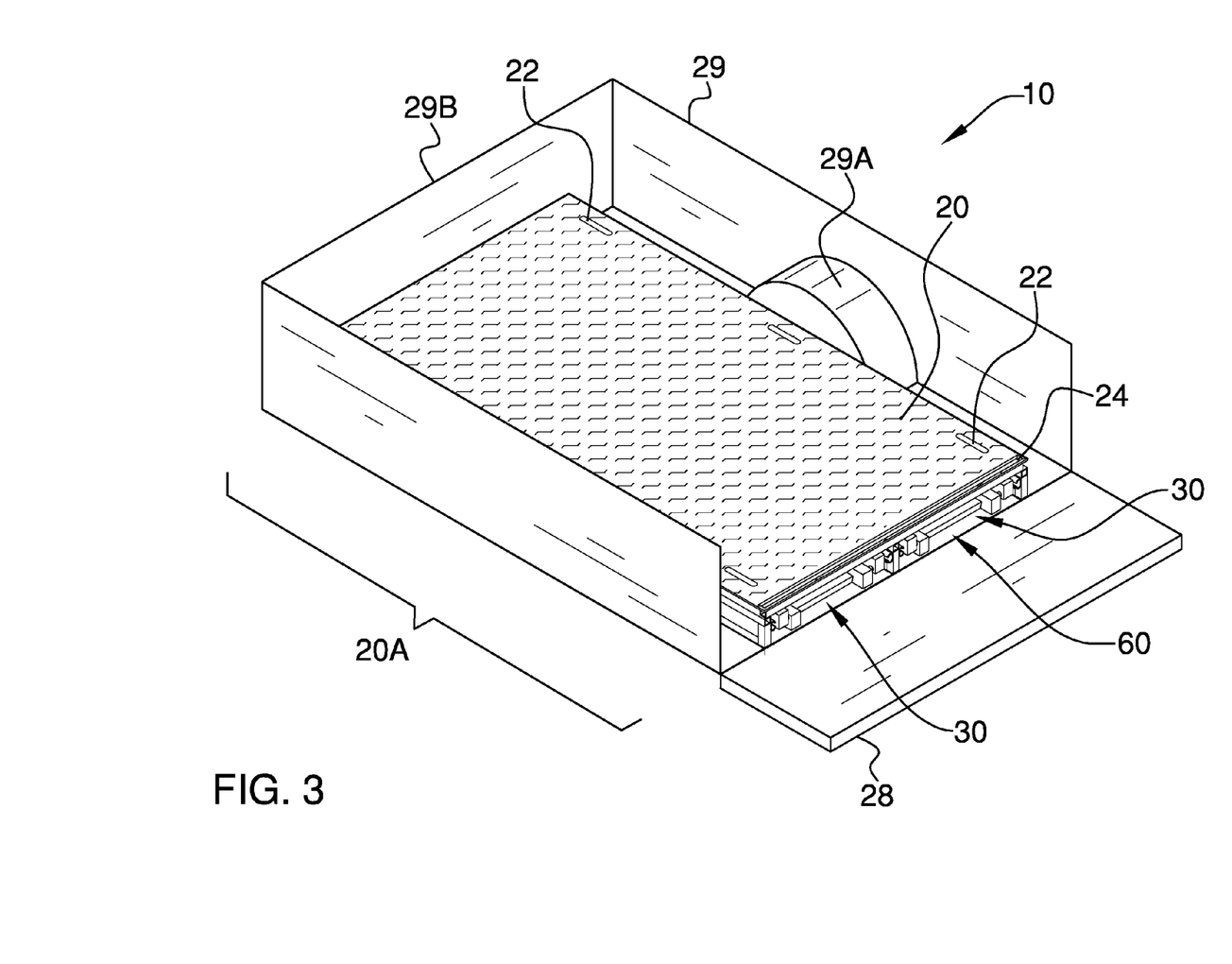
FIG. 3 is a perspective view, ramps fully inserted into the access.

Referring to FIG. 3, the ramps 30 are removably rolled within the access 60, Entrapment of the ramps 30 is via upward pivot of the tailgate 28. With tailgate 28 down, each ramp 30 is free to slide distally from the access 60 per a user's whim. Each ramp 30 can be fully removed from the access 60. Each ramp 30 can also then be selectively hooked into the slot 24 via each ramp's 30 keeper 32, which removably hooks into the slot 24 and prevents unwanted sliding or other movement of each ramp 30.

Figure 4:
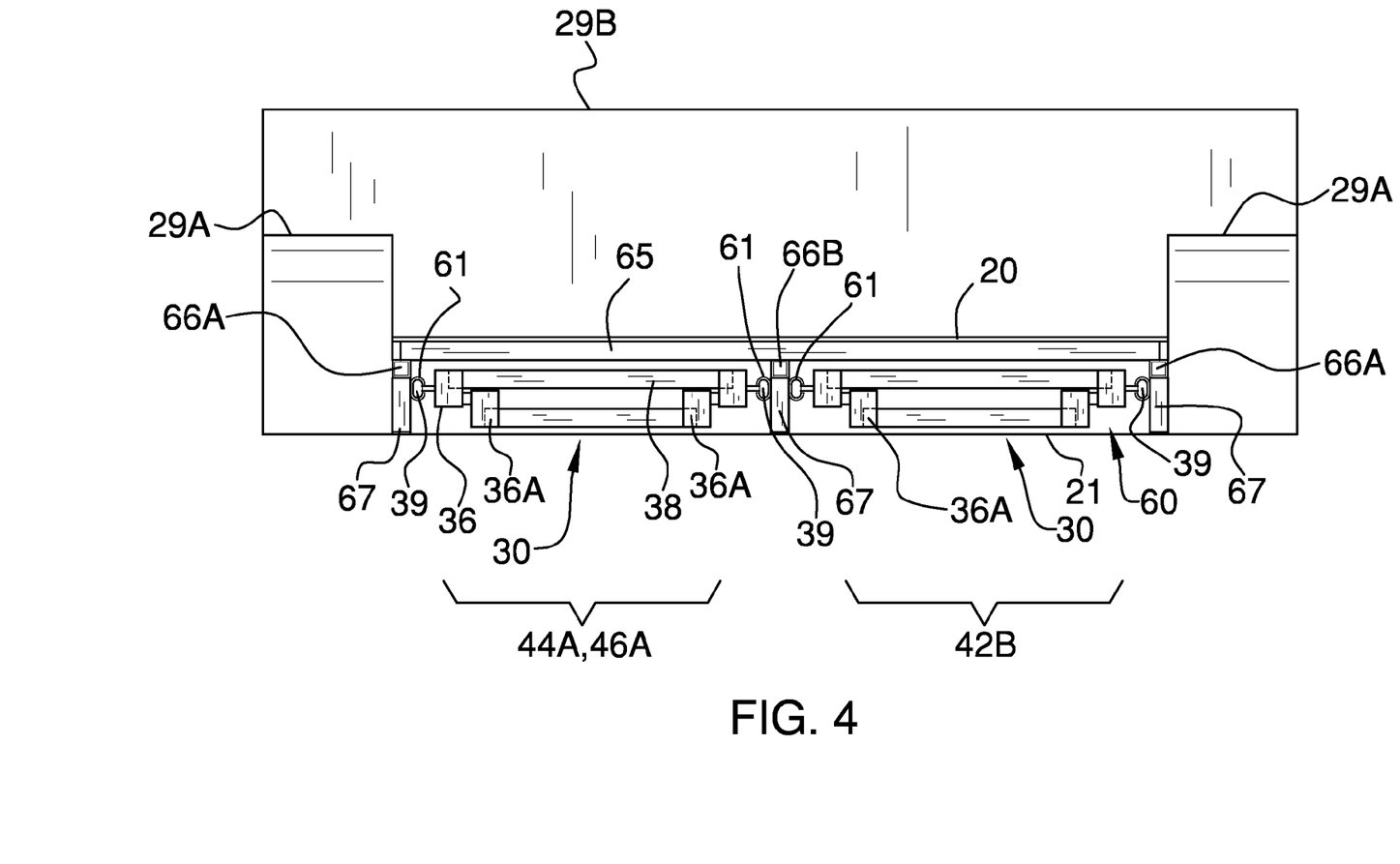
FIG. 4 is a rear elevation view, ramps fully inserted into the access.

Referring to FIG. 4, each first section 42 and each subsection 42a has an identical section width 42b. The second section 44 has a second section width 44a which is identical to the third section width 46a. The second section width 44a and third section width 46a are less than the section width 42b such that the second rails 36a of the second section 44 and the third section 46 fit inside the rails 36 of the subsection 42a and the first section 42.
This feature is important in that hingedly pivoting the second section 44 and third section 46 into the fully collapsed state for the ramps 30 provides a low height profile, thereby allowing the access 60 to be of lessened height.

Figure 7:
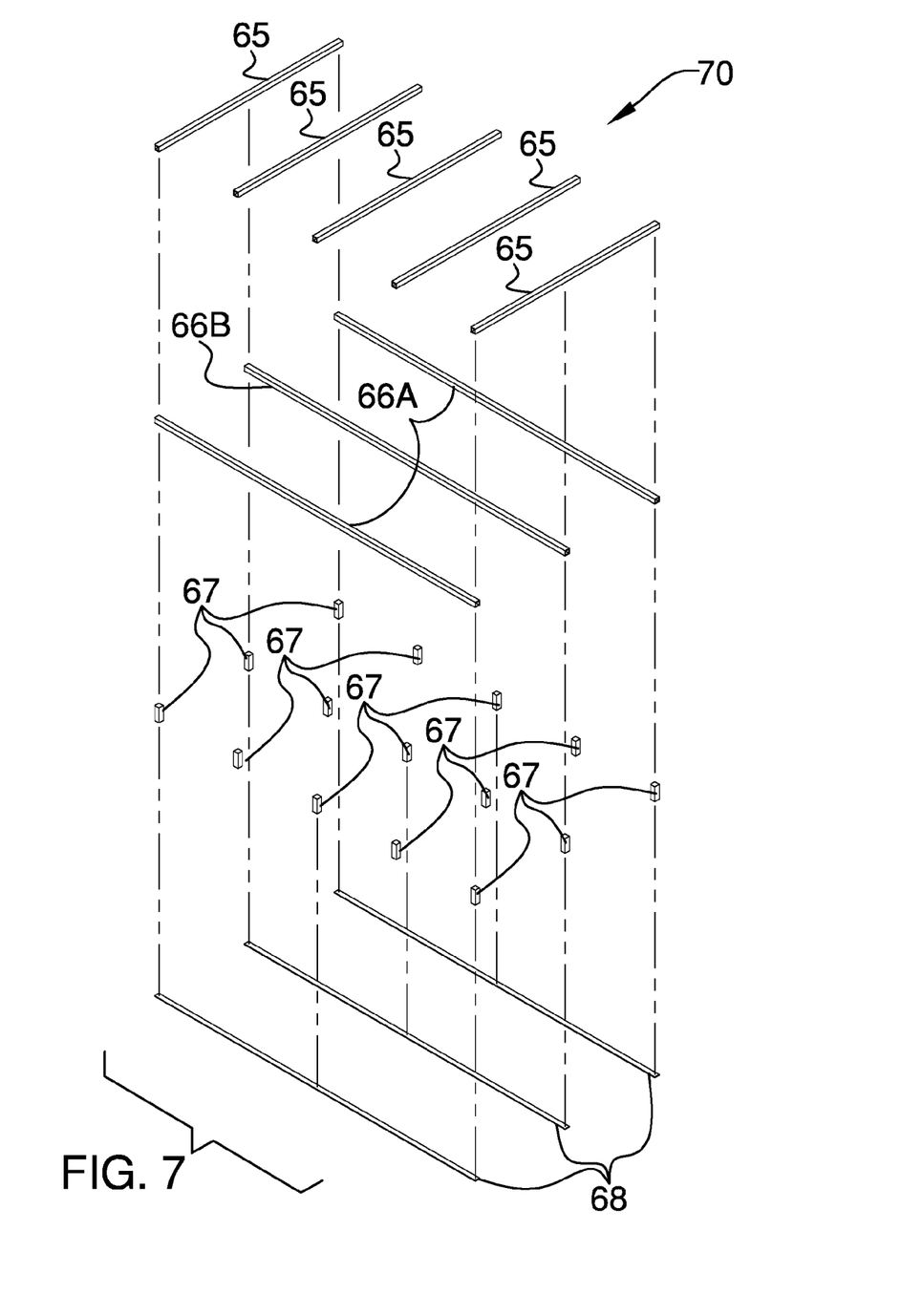
FIG. 7 is an exploded perspective view of the supports.

Referring to FIG. 7, the apparatus 10 support structure 70 comprises a trio of spaced apart longitudinal supports comprising a pair of identical lateral supports 66a spaced outwardly from a center support 66b. Each of the trio of spaced apart lower supports 68 is individually spaced apart from and parallel to each longitudinal support, respectively. The plurality of spaced apart upright supports 67 join the longitudinal supports to the lower supports 68. Each longitudinal support is joined to a lower support 68 via five upright supports 67 in order to insure a strong support structure 70 for the platform 20. The plurality of cross supports 65 is disposed above the longitudinal supports and directly below the platform 20.

Figure 6:
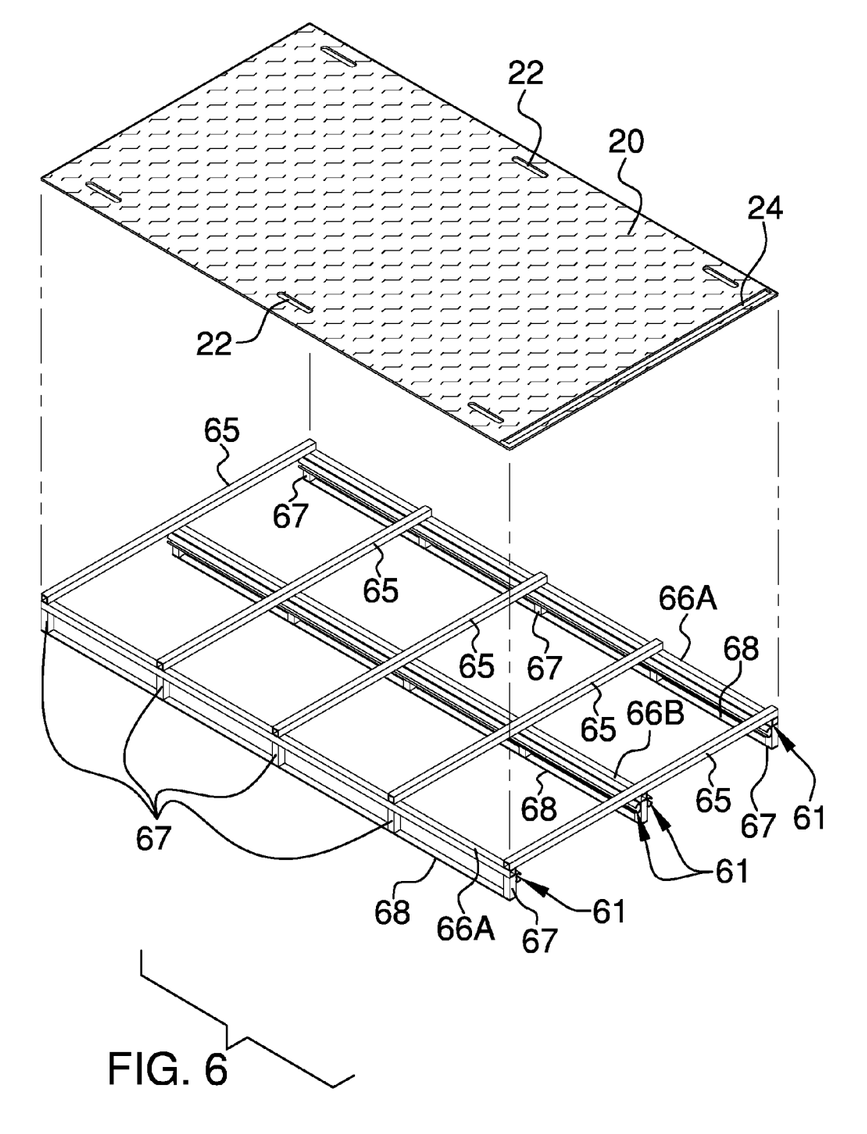
FIG. 6 is a partially exploded perspective view of the platform and underlying supports structure.

Referring to FIG. 6, the platform 20 is fitted over the support structure 70. The support structure 70 forms the access 60. A channel 61 is disposed on either side of the center support 66b. A channel 61 is disposed on the inner side of each lateral support 66a.

Figure 5:
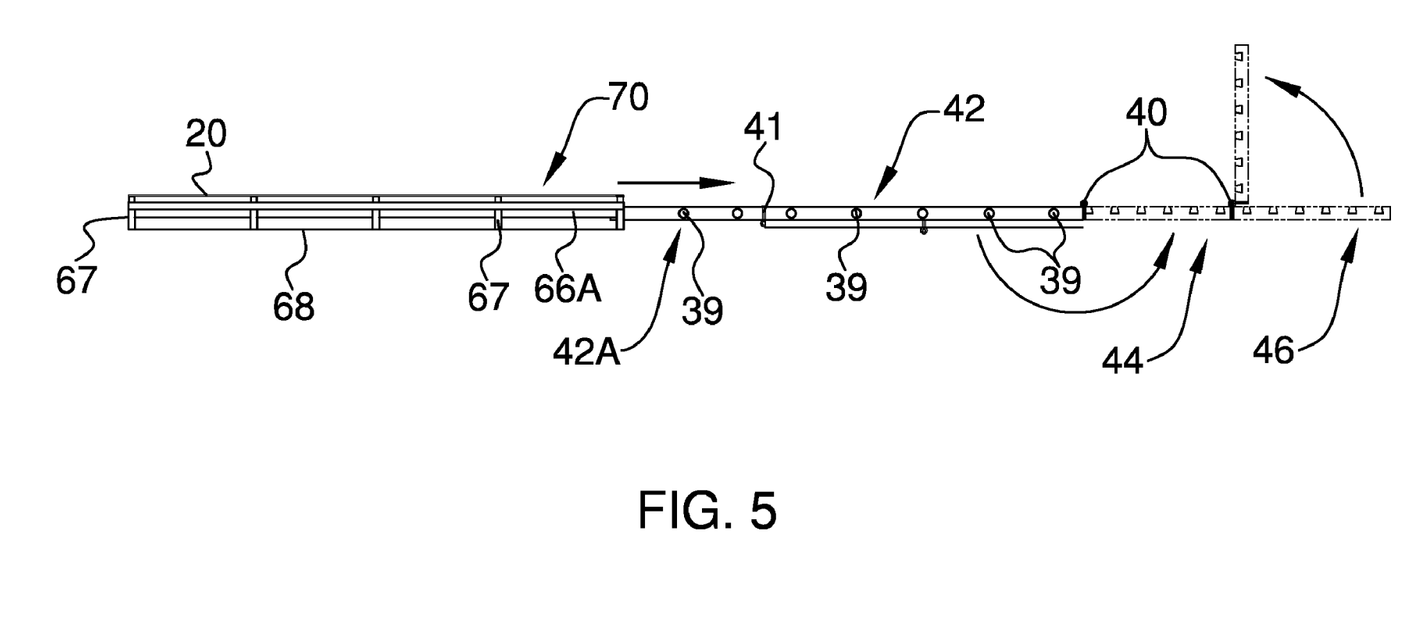
FIG. 5 is a lateral elevation view of the support structure and ramps.

Referring to FIG. 5 and continuing to refer to FIGS. 1, 2, and 3, the pair of identical spaced apart ramps 30 each has a proximal end 31a and a distal end 31b. It is important to note that the possible ramp length 35 is selectively greater than the platform length 20a. Each ramp 30 comprises a first ramp subsection 42a disposed at the ramp proximal end 31a and hingedly affixed to a first section 42 via hinge 41. Each first section 42 and subsection 42a comprises a pair of spaced apart rails 36 joined by a plurality of equally spaced apart rungs 38.
A first leg 50 is hingedly disposed on each rail 36 of each subsection 42a. A second leg 52 is hingedly and distally disposed on each rail 36 of each section 42. The first leg length 51 is less than the second leg length 53. The first leg 50 is selectively positioned atop the tailgate 28, as chosen. The second leg 52 is selectively used upon a chosen support surface. Selective use of the first legs 50 and the second legs 52 provide for ramp 30 chosen angles. The third legs 54 are hingedly affixed distally to the second rails 36a of each second section 44. The third leg length 55 is less than the second leg length 53, further selectively providing for ramp 30 chosen angles. Each second section 44 is attached distally to each first section 42 via lockably positionable bi-directional hinges 40. The second section 44 has a second section width 44a less than that of the first section 42 section width 42b such that the second section 44 is selectively fitted between the rails 36 of the first section 42. The proximal end 31a of each second section 44 has a keeper 32 which is selectively fitted within the platform slot 24. Each second section 44 comprises a pair of spaced apart second rails 36a joined by a plurality of equally spaced apart second rungs 38a. Each third section 46 is attached distally to each second section 44 via lockably positionable bi-directional hinges 40. Each third section 46 has second rails 36a and second rungs 38a identical to those of the second section's 44. Each third section 46 has a third section width 46a identical to that of each second section width 44a.

Referring again to FIGS. 1 and 4, the plurality of spaced apart rollers 39 is disposed on each rail 36. Each roller 39 removably rolls within one of the corresponding channels 61, respectively, providing for ease of insertion and removal of the ramps 30 from the access 60.

With respect to the above description then, it is to be realized that the optimum dimensional relationships for the parts of the truck bed apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the truck bed apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the truck bed apparatus may be used.

Therefore, the foregoing is considered as illustrative only of the principles of the truck bed apparatus. Further, since numerous modifications and changes will readily occur to those skilled in the art, it is not desired to limit the truck bed apparatus to the exact construction and operation shown and described, and accordingly, all suitable modifications and equivalents may be resorted to, falling within the scope of the truck bed apparatus.

What is claimed is:
1. A truck bed apparatus in combination with vehicle having a truck bed, the truck bed apparatus comprising:
    a pair of spaced apart vertical side panels;
    a vertical head panel spaced apart from a pivoting tailgate;
    a platform disposed between the side panels, the head panel, and the tailgate;
    a plurality of spaced apart tiedowns disposed within the platform;
    a slot within a rear of the platform;
    a support structure disposed below the platform, the support structure forming an access, the support structure comprising:
        a trio of spaced apart longitudinal supports comprising a pair of identical lateral supports spaced outwardly from a center support;
        a trio of spaced apart lower supports spaced apart from and paralleling each longitudinal support, respectively;
        a plurality of spaced apart upright supports joining the longitudinal supports to the lower supports;

a plurality of cross supports disposed above the longitudinal supports;

a channel disposed on an either side of the center support;

a channel disposed on an inner side of each lateral support;

a pair of identical spaced apart ramps, each ramp having a proximal end and a distal end, each ramp comprising:

a first ramp subsection disposed at the ramp proximal end, each subsection hingedly affixed to a first section, each first section and each subsection comprising a pair of spaced apart rails joined by a plurality of equally spaced apart rungs, each first section and each subsection having an identical section width, a proximal end of each subsection having a keeper selectively fitted within the platform slot;

a first leg hingedly disposed on each rail of each first section, the first leg having a first leg length;

a second leg hingedly disposed on each rail of each first section, the second leg having a second leg length greater than the first leg length;

a plurality of spaced apart rollers disposed on each rail of each subsection and each first section, each roller removably rolling within one of the channels, respectively;

a second section attached distally to each first section via lockably positionable bi-directional hinges, each second section having a second section width less than each first section width such that the second section is selectively fitted between the rails of the first section, each second section comprising:

a pair of spaced apart second rails joined by a plurality of equally spaced apart second rungs;

a second leg on the distal end of each second rail, each second leg longer than each first leg of each first section;

a third section attached distally to each second section via lockably positionable bi-directional hinges, each third section having second rails and second rungs identical to those of the second sections, each third section having a third section width identical to that of each second section width.

\* \* \* \* \*